United States Patent
Duftler et al.

(10) Patent No.: US 8,867,337 B2
(45) Date of Patent: Oct. 21, 2014

(54) STRUCTURE-AWARE CACHING

(75) Inventors: Matthew J. Duftler, Mahopac, NY (US); Thomas A. Mikalsen, Cold Spring, NY (US); Jonathan P. Munson, Putnam Valley, NY (US); Revathi Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 13/094,039

(22) Filed: Apr. 26, 2011

(65) Prior Publication Data

US 2012/0278558 A1    Nov. 1, 2012

(51) Int. Cl.
H04L 29/08    (2006.01)
G06F 12/08    (2006.01)

(52) U.S. Cl.
CPC ..................... *G06F 12/08* (2013.01)
USPC ........... 370/219; 709/219; 709/236; 711/113; 711/129

(58) Field of Classification Search
USPC ............ 709/219–239, 203, 216; 707/10, 103; 711/122, 133, 134, 141; 715/501, 715/501.1
See application file for complete search history.

(56) References Cited

U.S. PATENT DOCUMENTS

| | | |
|---|---|---|
| 6,415,335 B1 | 7/2002 | Lowery et al. |
| 6,421,726 B1 | 7/2002 | Kenner et al. |
| 6,502,125 B1 | 12/2002 | Kenner et al. |
| 6,665,726 B1 | 12/2003 | Leighton et al. |
| 6,751,673 B2 | 6/2004 | Shaw |
| 6,898,603 B1 * | 5/2005 | Petculescu et al. ........... 707/600 |
| 6,963,981 B1 | 11/2005 | Bailey et al. |
| 6,981,180 B1 | 12/2005 | Bailey et al. |
| 7,010,578 B1 | 3/2006 | Lewin et al. |
| 7,058,706 B1 | 6/2006 | Iyer et al. |
| 7,111,057 B1 | 9/2006 | Sherman et al. |
| 7,113,935 B2 | 9/2006 | Saxena |
| 7,127,713 B2 | 10/2006 | Davis et al. |
| 7,133,905 B2 | 11/2006 | Dilley et al. |
| 7,136,922 B2 | 11/2006 | Sundaram et al. |
| 7,143,170 B2 | 11/2006 | Swildens et al. |
| 7,149,797 B1 | 12/2006 | Weller et al. |
| 7,149,807 B1 | 12/2006 | Kontothanassis |
| 7,155,723 B2 | 12/2006 | Swildens et al. |
| 7,185,052 B2 | 2/2007 | Day |
| 7,194,522 B1 | 3/2007 | Swildens et al. |
| 7,200,681 B1 | 4/2007 | Lewin et al. |
| 7,260,639 B2 | 8/2007 | Afergan et al. |
| 7,293,093 B2 | 11/2007 | Leighton et al. |
| 7,299,291 B1 | 11/2007 | Shaw |
| 7,359,985 B2 | 4/2008 | Grove et al. |
| 7,373,416 B2 | 5/2008 | Kagan et al. |
| 7,392,325 B2 | 6/2008 | Grove et al. |
| 7,395,355 B2 | 7/2008 | Afergan et al. |
| 7,502,858 B2 | 3/2009 | Gupta et al. |
| 7,590,739 B2 | 9/2009 | Swildens et al. |

(Continued)

*Primary Examiner* — Andrew Chriss
*Assistant Examiner* — John Lequang
(74) *Attorney, Agent, or Firm* — Ryan, Mason & Lewis, LLP

(57) ABSTRACT

Techniques for structure-aware caching are provided. The techniques include decomposing a response from an origin server into one or more independently addressable objects, using a domain specific language to navigate the response to identify the one or more addressable objects and create one or more access paths to the one or more objects, and selecting a route to an object by navigating an internal structure of a cached object to discover one or more additional independently addressable objects.

16 Claims, 3 Drawing Sheets

(56) References Cited

U.S. PATENT DOCUMENTS

| | | |
|---|---|---|
| 7,600,025 B2 | 10/2009 | Lewin et al. |
| 7,603,439 B2 | 10/2009 | Dilley et al. |
| 7,660,296 B2 | 2/2010 | Fletcher et al. |
| 7,711,647 B2 | 5/2010 | Gunaseelan et al. |
| 7,725,602 B2 | 5/2010 | Liu et al. |
| 7,743,132 B2 | 6/2010 | Tewari et al. |
| 7,752,258 B2 | 7/2010 | Lewin et al. |
| 7,870,278 B2 * | 1/2011 | Corl et al. ............ 709/230 |
| 2002/0107934 A1 | 8/2002 | Lowery et al. |
| 2002/0107935 A1 | 8/2002 | Lowery et al. |
| 2002/0163882 A1 | 11/2002 | Bornstein et al. |
| 2003/0046365 A1 * | 3/2003 | Pfister et al. ............ 709/219 |
| 2003/0188009 A1 * | 10/2003 | Agarwalla et al. ........ 709/236 |
| 2007/0250560 A1 | 10/2007 | Wein et al. |
| 2007/0261004 A1 | 11/2007 | Swildens et al. |
| 2007/0271385 A1 * | 11/2007 | Davis et al. ............ 709/228 |
| 2008/0086523 A1 | 4/2008 | Afergan et al. |
| 2008/0086524 A1 | 4/2008 | Afergan et al. |
| 2008/0091767 A1 * | 4/2008 | Afergan et al. ........... 709/202 |
| 2008/0205405 A1 * | 8/2008 | Corl et al. ............ 370/392 |
| 2011/0060812 A1 * | 3/2011 | Middleton ............ 709/219 |

\* cited by examiner

STRUCTURE-AWARE CACHING

FIELD OF THE INVENTION

Embodiments of the invention generally relate to information technology, and, more particularly, to caching technology.

BACKGROUND OF THE INVENTION

Caching is an often-employed technique to improve the apparent performance of a network service, wherein a proxy to a service receives requests to a service and attempts to satisfy a request using data received from the service in fulfillment of past requests. In existing approaches, caching proxies are often employed for Web applications, where cacheable resources are identified by universal resource locators (URLs). However, these proxies are unaware of application semantics, and therefore cannot take advantage of relationships between independently addressable elements, thus limiting cache effectiveness.

By way of example, suppose there is the following sequence of requests.
1. GET/customer/(returns a collection of customer objects)
2. PUT/customer/200178578 { . . . customer data . . . }
3. GET/customer/

The semantics of the application dictate that request 2 modifies the data that is returned in request 3. If the cache is unaware of these semantics, and in the absence of explicit invalidation notification from the application, the cache will therefore either behave incorrectly (returning stale data) or will not attempt to cache this data.

SUMMARY OF THE INVENTION

Principles and embodiments of the invention provide techniques for structure-aware caching. An exemplary method (which may be computer-implemented) for structure-aware caching, according to one aspect of the invention, can include steps of decomposing a response from an origin server into one or more independently addressable objects, using a domain specific language to navigate the response to identify the one or more addressable objects and create one or more access paths to the one or more objects, and selecting a route to an object by navigating an internal structure of a cached object to discover one or more additional independently addressable objects.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
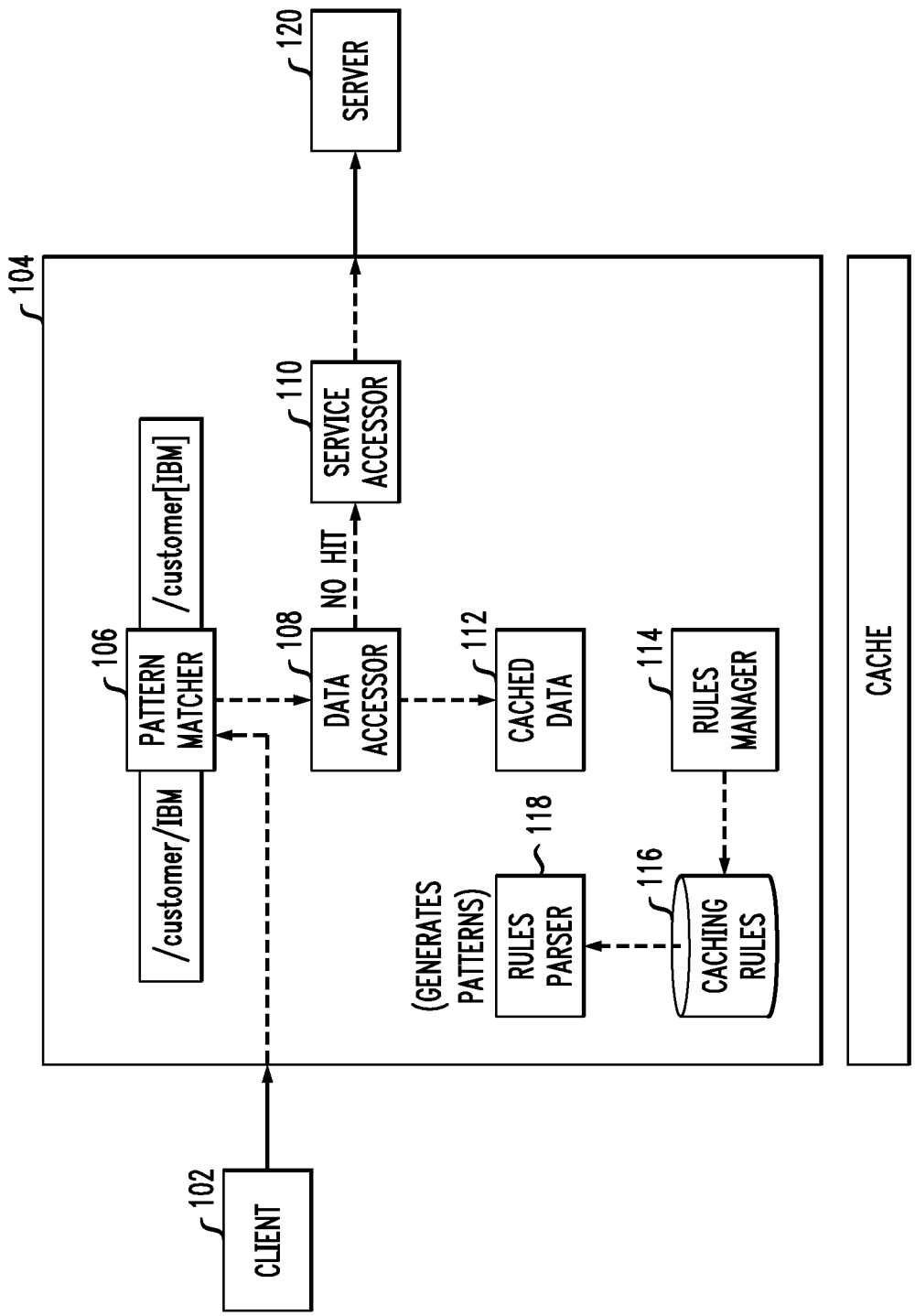
FIG. 1 is a block diagram illustrating an example embodiment, according to an aspect of the invention.

Principles of the invention include a structure-aware caching system for hypertext transfer protocol (HTTP) services. Generic web caches must treat URLs as independently addressable resources, whereas in modern REST-based web applications, the URL patterns can be used to navigate connected, application specific, data structures. For example, the pattern "/customer/4/address" can mean "get me the address of customer number 4." In this instance, "address" and "customer" are two application specific objects that are related. As described herein in connection with one or more embodiments of the invention, a structure-aware cache is able to acknowledge that the entities/resources being cached are related to each other, and is also able to traverse these relationships within the cache store and use this knowledge to enforce cache consistency. Such a cache uses the patterns in the URL to understand the interconnectedness of the application objects.

Accordingly, given a class of web applications where URLs identify elements of connected data structures, one or more embodiments of the invention can include implementing a smart cache that can exploit the relationships between data structures for efficient caching. Additionally, the techniques detailed herein can also include using the same caching system to front different backend servers that support HTTP without writing custom code in each case.

One or more embodiments of the invention include techniques for describing the logical data structures served by applications, the mappings between the data structures and the URLs used by clients to access them, such that elements of the data structures can be cached correctly. Additionally, one or more embodiments of the invention also include implementing a cache for REST-based web applications, whose caching behavior can be governed by application-specific caching rules. Further, a cache for a REST-based application does not alter the contracts between the client and the web application. To enable a cache for a new web application, no "coding" is needed.

As described herein, one or more embodiments of the invention can be configured and/or customized for a specific web application via a rules document. Further, one or more embodiments of the invention can include cache extensions to expose new URL patterns to assist clients to obtain desired data more efficiently (for example, via fewer HTTP requests).

The techniques detailed herein can include decomposing a response from an origin server into multiple, independently addressable sub-objects. A domain specific language is used to navigate responses, to identify addressable sub-objects, and to create additional access paths to those sub-objects. A request for a sub-object (for example, a given URL) can be fulfilled from the cache, even when that particular access path (for example, the URL) has not been requested before. An optimal route to an object can be selected by navigating the internal structure of a cached object to discover additional independently addressable objects.

By way of example, one or more embodiments of the invention can proceed as follows. A system administrator uses a rules template to author caching rules for a specific backend server. These caching rules capture the main data objects returned by the server, the format of the data objects, the relationships that exist between one data object and another (containment and reference), the cache expiration defaults for each data object, and anticipated URL patterns for each data object. Also, the caching rules can be persisted.

In one or more embodiments of the invention, a rules parser component parses these rules and generates a list of patterns. Required storage structures are initialized, and the cache is ready to function. Incoming URLs go through a pattern matcher component. The pattern matcher component directs the client request to the data access layer of the cache, along with any appropriate transformations. Further, the data access layer traverses to the correct location in the cache to serve up the data for the request. In the case of a cache miss, the service is contacted and the cache is appropriately refreshed.

FIG. 1 is a block diagram illustrating an example embodiment, according to an aspect of the invention. By way of illustration, FIG. 1 depicts a client 102, a cache 104 and a server 120. Additionally, the cache 104 includes a pattern matcher module 106, a data accessor module 108, a service accessor module 110, a cached data module 112, a rules manager module 114, a caching rules module 116 and a rules parser module 118.

As depicted in FIG. 1, the server 120 can be a web server with RESTful interfaces, and the client 102 can make REST invocations to server resources. The cache 104 sits between the client 102 and the server 120. The cache 104 does not alter the client's access patterns; that is, the client can continue to use the same URLs to access server resources. Through the caching rules, the cache is aware of the structure of key resources (that is, objects) that the server returns to the client. Also through the caching rules, the cache is aware of the relationships that exist between those key resources. This awareness (of the structure and relationships between server objects) enables efficient caching.

Additionally, in one or more embodiments of the invention, the cache can instruct the client of new access URLs that would allow more efficient fetching of server data. This can be thought of, for example, as cache extensions. For instance, if a client always requests/subscriber/X, reads a property from the returned object, and uses it as a key to access another collection, for example, /customer/Y, a cache extension might allow the same to be possible with a new URL/subscriber/X/customer.

A rules parser module 118 reads the rules (for example, from the caching rules module 116 via the rules manager module 114) and generates a mapping between URL patterns and cache access patterns (which can include one or more steps). The pattern matcher module 106 uses such a mapping to map an incoming URL to a cache access pattern. Additionally, a caching rule identifies i) the object/collection for which the rule applies, ii) the data access abstraction for the object (that is, how to access this object in the cache in the abstract), and iii) the requested server object (that is, the field to look for in the server's response).

The following are rule examples.
Url-Mapping Section:

```
Url: /customer
Resource:'customer'
cache-access: customer
server-object-type: "named-array" | "array"
Server-object-name: 'List'
Server-object-id: 'Id'
expiration-rule: callback
OnPost:
    Id_Is_Where: ResponseText
    server-object-type : "Long"
    server-object-id: 'Id'
    cache_on_post : Yes
    cache_returned_object : No
Url: /customer/*
Resource:'customer'
cache-access: customer.*
server-object-type: "named-object" | "object"
Server-object-name: 'Customer'
Server-object-id: 'Id'
Url: /subscriber
Resource:'subscriber'
cache-access: subscriber
server-object-type: "named-array" | "array"
Server-object-name: 'List'
Server-object-id: 'Id'
expiration-rule: callback
OnPost:
    Id_Is_Where: ResponseText
    server-object-type : "Long"
    server-object-id: 'Id'
    cache_on_post : Yes
    cache_returned_object : No
Url: /subscriber/*
Resource:'subscriber'
cache-access: subscriber.*
server-object-type: "named-object" | "object"
Server-object-name: 'Subscriber'
Server-object-id: 'Id'
```

Relationship Section:

```
relationships:
    subscriber[*].customerId references customer[*].id
    customer[*] contains address[ ]
....
```

Figure 2:
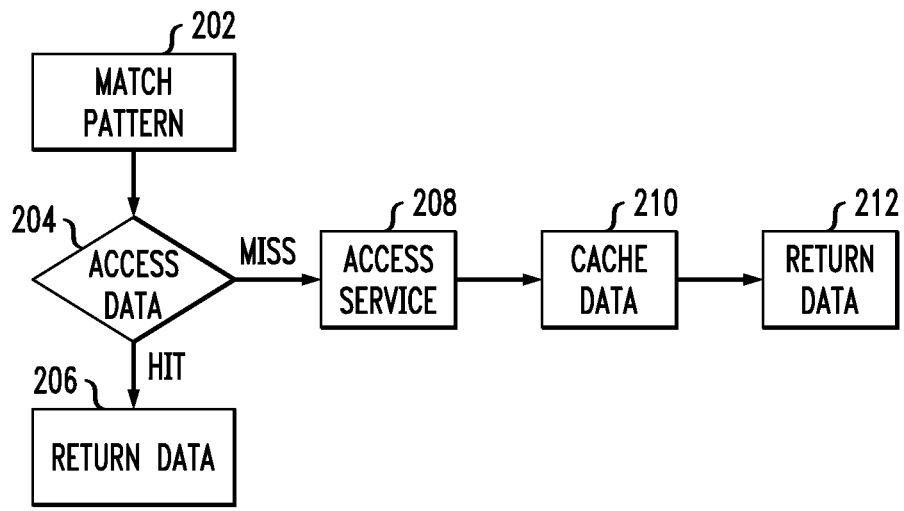
FIG. 2 is a flow diagram illustrating caching techniques, according to an embodiment of the invention.

The data flow depicted in FIG. 1 is captured in FIG. 2. Accordingly, FIG. 2 is flow a diagram illustrating caching techniques, according to an embodiment of the invention. Step 202 includes pattern matching, which can include mapping an incoming URL to a cache access pattern. Step 204 includes accessing data, and if there is a miss, proceeding to step 208, while if there is a hit, proceeding to step 206. Accessing data, in this context, refers to determining if the object associated with the requested URL can be satisfied by an object in the cache. To be "satisfied" by the cache means that the requested object is found in the cache and is valid (for example, has not expired, meets some policy set by the client or server, etc.).

Accessing the data can be carried out in a number of ways, according to one or more embodiments of the invention. By way of example, one approach is to consider the URL as a "key" into an associative array (for example, a hash table), and when the request arrives, look-up the object under the requested URL. If the requested object can be satisfied from the cache, it is referred to as a "hit." Otherwise, it is referred to as a "miss."

Step 206 includes returning data. The data being returned is the object that was determined to be in the cache. Further, the data is being returned because the client requested it via the request URL, and as such, the data is being returned to the client. Step 208 includes accessing a service. The system identifies the service by the requested URL, and the system accesses the service using the protocol identified by the requested URL. Step 210 includes caching data. This step includes taking the response from the service (that is, the origin server), decomposing it into one or more objects, and adding those objects to the cache.

Additionally, step 212 includes returning data. This step functions in similar fashion to step 206, only with different/ cached data. The difference is the initial source of the object. In step 206, the object was found in the cache and then returned. In step 208, the object was first retrieved from the service and then returned. Note that in one or more embodiments of the invention, a particular order of the steps is not required. For example, the object could be returned to the client (step 206) and then added to the cache (step 212), or those steps could be carried out concurrently.

In connection with the techniques detailed herein, below are examples of algorithms for the various HTTP operations.
POST (Create):
   Receive post invocation, with URL path and post object.
   Forward request to service and read response.
   If response indicates error, return response to service and end.
   Match URL path with pattern. If no match, return response to service and end.
   Create cache entry object, associate post object with it and set timestamp of cache entry to current time.
   If cache access path (c.a.p.) indicates collection type:
   Read object indicated by c.a.p.
   If is null, create collection
   Add cache entry to collection.
   Else if c.a.p. does not indicate collection (array) type:
   Read parent object of object indicated with c.a.p.
   Store cache entry into parent object using field name or index indicated by c.a.p.
   Return response to client and end.
GET(Read):
   Receive get invocation, with URL path.
   Match URL path with pattern. If no match, forward request to service, read response, return to client, and end.
   Using cache-access rule, read cache for object.
   If object is null, or if cache-entry timestamp is beyond expiration date:
   Forward request to service and read response.
   If response indicates error, return response to service and end.
   Use server-object rules to extract response object.
   Create cache entry object (parse to the extent only as needed by rules), associate response object with it and set timestamp of cache entry to current time.
   Return response to client and end.
   Else if object is not null and cache-entry timestamp is within expiration date:
   Format a response using server-object rules.
   Return response to client and end.
PUT (Update):
   Receive put invocation, with URL path and put object.
   Forward request to service and read response.
   If response indicates error, return response to service and end.
   Match URL path with pattern. If no match, return response to service and end.
   Create cache entry object, associate put object with it and set timestamp of cache entry to current time.
   Read parent object of object indicated by c.a.p.
   Store cache entry into parent object using field name or index indicated by c.a.p.
   Return response to client and end.
DELETE (Delete):
   Receive put invocation, with URL path and put object.
   Forward request to service and read response.
   If response indicates error, return response to service and end.
   Match URL path with pattern. If no match, return response to service and end.
   Read parent object of object indicated by c.a.p.
   Delete cache entry from parent object using field name or index indicated by c.a.p.
   Return response to client and end.

Figure 3:
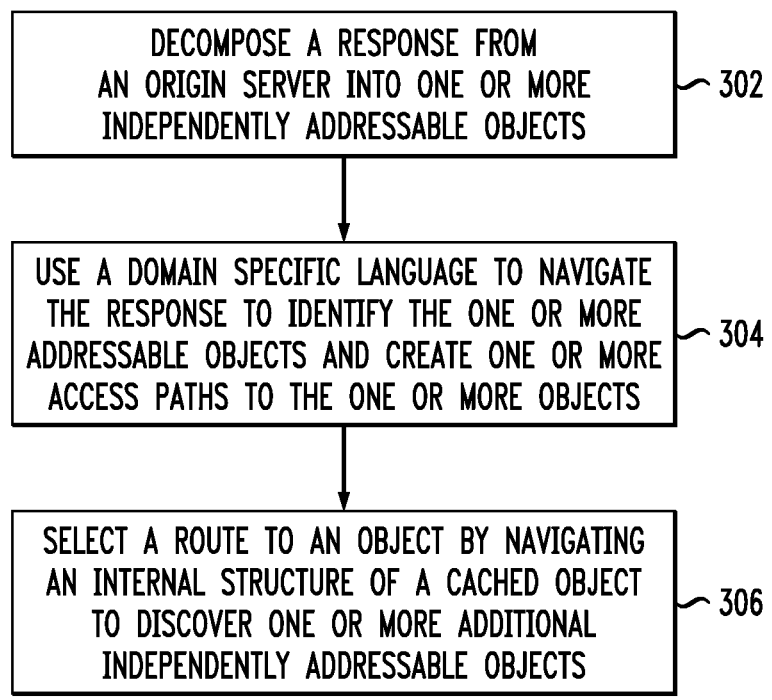
FIG. 3 is a flow diagram illustrating techniques for structure-aware caching, according to an embodiment of the invention.

FIG. 3 is a flow diagram illustrating techniques for structure-aware caching, according to an embodiment of the present invention. Step 302 includes decomposing a response from an origin server into one or more independently addressable objects. This step can be carried out, for example, using a rules parser module. Decomposing a response from an origin server into one or more independently addressable objects can include using one or more rules that specify behavior for caching results from the origin server. The one or more rules capture one or more main data objects returned by the server, the format of the one or more data objects, relationships that exist between the one or more data objects, a cache expiration default for each data object, and one or more anticipated universal resource locator (URL) patterns for each data object. Also, the one or more rules identify one or more objects for which the rules apply, a data access abstraction for each object, and a requested server object.

Further, one or more embodiments of the invention include parsing the one or more rules and generating a mapping between URL patterns and cache access patterns, as well as using the mapping between URL patterns and cache access patterns to direct an incoming URL to a cache access pattern. Directing an incoming URL to a cache access pattern can include directing the incoming URL to a cache access pattern along with one or more appropriate transformations.

Step 304 includes using a domain specific language to navigate the response to identify the one or more addressable objects and create one or more access paths to the one or more objects. This step can be carried out, for example, using a pattern matcher module.

Step 306 includes selecting a route to an object by navigating an internal structure of a cached object to discover one or more additional independently addressable objects. This step can be carried out, for example, using a data access module. Selecting a route to an object by navigating an internal structure of a cached object can include traversing to a correct location in the cache to serve up appropriate data.

The techniques depicted in FIG. 3 can additionally include contacting a service and appropriately refreshing a cache in a case of a cache miss, as well as instructing a client of one or more new URLs to facilitate more efficient fetching of server data. Further, one or more embodiments of the invention also include satisfying one or more subsequent requests for one or more different URLs from a cache without having to go to the origin server.

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a rules parser module, a pattern matcher module, and a data access module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
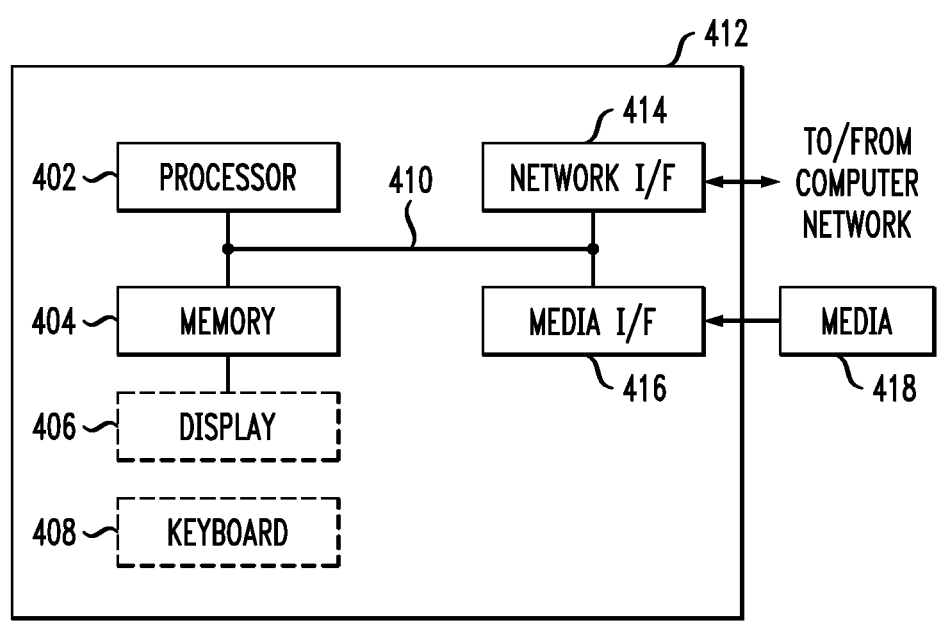
FIG. 4 is a system diagram of an exemplary computer system on which at least one embodiment of the invention can be implemented.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing cache capability that does not alter the contracts between a client and a web application.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for structure-aware caching, wherein the method comprises:
   generating multiple rules for decomposing and caching multiple objects into a cache based on the structure of each of the multiple objects and one or more relationships that exist between the multiple objects, wherein the multiple rules capture one or more main data objects returned by the server, the format of the one or more data objects, relationships that exist between the one or more data objects, a cache expiration default for each data object, and one or more anticipated uniform resource locator (URL) patterns for each data object;
   decomposing a response from an origin server into multiple independently addressable objects and adding the multiple independently addressable objects to a cache based on the multiple generated rules, wherein each of the multiple independently addressable objects comprises a uniform resource locator (URL);
   using a domain specific language to navigate the response to identify the multiple independently addressable objects and create one or more cache access paths to the multiple independently addressable objects;
   receiving a request for a given cached object from the cache, wherein said given cached object is one of the of the multiple independently addressable objects; and
   selecting a given cache access path from the one or more cache access paths, within the cache to the given cached object by:
      generating a mapping between the one or more anticipated uniform resource locator (URL) patterns for each data object and the one or more cache access paths; and
      using said mapping to match the request to the given cache access path.

2. The method of claim 1, further comprising satisfying one or more subsequent requests for one or more different uniform resource locators (URLs) from a cache without having to go to the origin server.

3. The method of claim 1, wherein the multiple rules identify one or more objects for which the rules apply, a data access abstraction for each object, and a requested server object.

4. The method of claim 1, further comprising parsing the multiple rules and generating a mapping between one or more uniform resource locator (URL) patterns and one or more cache access patterns.

5. The method of claim 4, further comprising using the mapping between one or more uniform resource locator (URL) patterns and one or more cache access patterns to direct an incoming URL to a cache access pattern, wherein directing an incoming URL to a cache access pattern comprises directing the incoming URL to a cache access pattern along with one or more appropriate transformations.

6. The method of claim 1, wherein said selecting comprises traversing to a correct location in the cache to serve up appropriate data.

7. The method of claim 1, further comprising instructing a client of one or more new uniform resource locators (URLs) to facilitate more efficient fetching of server data.

8. The method of claim 1, further comprising providing a system, wherein the system comprises one or more distinct software modules, each of the one or more distinct software modules being embodied on a tangible computer-readable recordable storage medium, and wherein the one or more distinct software modules comprise a rules parser module, a pattern matcher module, and a data access module executing on a hardware processor.

9. A computer program product comprising a tangible computer readable recordable storage device including computer useable program code for structure-aware caching, the computer program product including:
   computer useable program code for generating multiple rules for decomposing and caching multiple objects into a cache based on the structure of each of the multiple objects and one or more relationships that exist between the multiple objects, wherein the multiple rules capture one or more main data objects returned by the server, the format of the one or more data objects, relationships that exist between the one or more data objects, a cache expiration default for each data object, and one or more anticipated uniform resource locator (URL) patterns for each data object;
   computer useable program code for decomposing a response from an origin server into multiple independently addressable objects and adding the multiple independently addressable objects to a cache based on the multiple generated rules, wherein each of the multiple independently addressable objects comprises a uniform resource locator (URL);
   computer useable program code for using a domain specific language to navigate the response to identify the multiple independently addressable objects and create one or more cache access paths to the multiple independently addressable objects;
   computer useable program code for receiving a request for a given cached object from the cache, wherein said given cached object is one of the of the multiple independently addressable objects; and
   computer useable program code for selecting a given cache access path from the one or more cache access paths, within the cache to the given cached object by:
      generating a mapping between the one or more anticipated uniform resource locator (URL) patterns for each data object and the one or more cache access paths; and
      using said mapping to match the request to the given cache access path.

10. The computer program product of claim 9, further comprising computer useable program code for satisfying one or more subsequent requests for one or more different uniform resource locators (URLs) from a cache without having to go to the origin server.

11. The computer program product of claim 10, further comprising computer useable program code for parsing the multiple rules and generating a mapping between one or more uniform resource locator (URL) patterns and one or more cache access patterns.

12. The computer program product of claim 11, further comprising computer useable program code for using the mapping between one or more uniform resource locator (URL) patterns and one or more cache access patterns to direct an incoming URL to a cache access pattern.

13. A system for structure-aware caching, comprising:
a memory; and
at least one processor coupled to the memory and operative to:
generate multiple rules for decomposing and caching multiple objects into a cache based on the structure of each of the multiple objects and one or more relationships that exist between the multiple objects, wherein the multiple rules capture one or more main data objects returned by the server, the format of the one or more data objects, relationships that exist between the one or more data objects, a cache expiration default for each data object, and one or more anticipated uniform resource locator (URL) patterns for each data object;
decompose a response from an origin server into multiple independently addressable objects and adding the multiple independently addressable objects to a cache based on the multiple generated rules, wherein each of the multiple independently addressable objects comprises a uniform resource locator (URL);
use a domain specific language to navigate the response to identify the multiple independently addressable objects and create one or more cache access paths to the multiple independently addressable objects;
receive a request for a given cached object from the cache, wherein said given cached object is one of the of the multiple independently addressable objects; and
select a given cache access path from the one or more cache access paths, within the cache to the given cached object by:
generating a mapping between the one or more anticipated uniform resource locator (URL) patterns for each data object and the one or more cache access paths; and
using said mapping to match the request to the given cache access path.

14. The system of claim 13, wherein the at least one processor coupled to the memory is further operative to satisfy one or more subsequent requests for one or more different uniform resource locators (URLs) from a cache without having to go to the origin server.

15. The system of claim 13, wherein the at least one processor coupled to the memory is further operative to parse the multiple rules and generate a mapping between one or more uniform resource locator (URL) patterns and one or more cache access patterns.

16. The system of claim 15, wherein the at least one processor coupled to the memory is further operative to use the mapping between one or more uniform resource locator (URL) patterns and one or more cache access patterns to direct an incoming URL to a cache access pattern.

* * * * *